US006988377B2

(12) United States Patent
Bernas et al.

(10) Patent No.: US 6,988,377 B2
(45) Date of Patent: Jan. 24, 2006

(54) METHOD FOR MAKING EXTREME ULTRAVIOLET LITHOGRAPHY STRUCTURES

(75) Inventors: James J. Bernas, Horseheads, NY (US); Bradley F. Bowden, Edison, NJ (US); Kenneth E. Hrdina, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 572 days.

(21) Appl. No.: 10/302,347

(22) Filed: Nov. 22, 2002

(65) Prior Publication Data

US 2003/0226375 A1 Dec. 11, 2003

Related U.S. Application Data

(60) Provisional application No. 60/333,951, filed on Nov. 27, 2001.

(51) Int. Cl.
*C03B 19/06* (2006.01)
(52) U.S. Cl. .......................................... 65/17.3; 65/144
(58) Field of Classification Search .................. 65/395, 65/440, 17.2, 17.3, 144; 264/610, 621, 624, 264/629, 630, 636, 637
See application file for complete search history.

(56) References Cited

U.S. PATENT DOCUMENTS

| 4,200,445 A | * | 4/1980 | Bihuniak et al. ............. 65/17.2 |
| 4,622,057 A | * | 11/1986 | Chyung et al. ............... 65/17.2 |
| 4,684,385 A | * | 8/1987 | Clasen ........................ 264/1.21 |
| 4,789,389 A | | 12/1988 | Schermerhorn et al. |
| 4,888,036 A | * | 12/1989 | Clasen ........................ 65/17.2 |
| 4,940,675 A | | 7/1990 | Bohlayer et al. |
| 5,585,173 A | * | 12/1996 | Kamo et al. ............... 428/304.4 |
| 5,738,817 A | * | 4/1998 | Danforth et al. ............ 264/603 |
| 5,970,751 A | * | 10/1999 | Maxon et al. ................. 65/414 |
| 5,999,254 A | | 12/1999 | Seibert et al. |
| 6,118,150 A | | 9/2000 | Takahashi |
| 6,132,665 A | * | 10/2000 | Bui et al. ..................... 264/308 |
| 6,548,142 B1 | | 4/2003 | Kar et al. |
| 6,764,619 B2 | * | 7/2004 | Bernas et al. ............... 264/1.21 |
| 6,796,143 B2 | * | 9/2004 | Clasen et al. ................. 65/17.3 |
| 6,821,462 B2 | * | 11/2004 | Schulman et al. ............ 264/16 |
| 6,829,908 B2 | * | 12/2004 | Bowden et al. .............. 65/17.2 |
| 6,832,493 B2 | * | 12/2004 | Bowden et al. .............. 65/17.3 |
| 2003/0159464 A1 | | 8/2003 | Bowden et al. |

FOREIGN PATENT DOCUMENTS

| EP | 1106582 A2 | 6/2001 |
| WO | WO 01/07967 | 2/2001 |
| WO | WO 01/08163 A1 | 2/2001 |
| WO | WO 02/26647 A1 | 4/2002 |

* cited by examiner

*Primary Examiner*—Sean Vincent
(74) *Attorney, Agent, or Firm*—Timothy M. Schaeberle

(57) ABSTRACT

A method for forming EUV LITHOGRAPHY GLASS STRUCTURES WITH VOIDS is disclosed which includes forming a slurry mixture including silica soot particles, and inserting the slurry mixture into a casting mold. The method provides low weight mass reduced rigid glass structures with beneficial thermal stability. The casting mold includes therein a casting form. The casting form is adapted to provide selected geometry void spaces within the glass lithography structure. The slurry mixture is dried to form a green ware object. The casting form is removed from the green ware and the green ware object is consolidated into a lithography glass structure with voids.

33 Claims, 3 Drawing Sheets

METHOD FOR MAKING EXTREME ULTRAVIOLET LITHOGRAPHY STRUCTURES

RELATED APPLICATIONS

This application claims the benefit of U.S. Provisional Application, Ser. No. 60/333,951, filed Nov. 27, 2001 entitled METHOD FOR MAKING EXTREME ULTRAVIOLET LITHOGRAPHY STRUCTURES, by Bernas et al.

BACKGROUND OF THE INVENTION

1. Field of the Invention

The invention relates generally to methods for forming Extreme Ultraviolet (ELV) Lithography structures. More specifically, the invention relates to methods for forming high quality lithography glass structures with void spaces and more specifically, the invention relates to methods for forming low thermal expansion ELV Lithography glass reduced weight rigid support structures from ultra low expansion glass particles.

2. Background

Ultra low expansion glass, such as a type sold by Corning, Incorporated, Canton, N.Y. under the trade name ULE® glass is formed by a process known as flame hydrolysis. Chemical vapors are introduced into a gas-oxygen burner at approximately 1700° C. The combustion reaction forms sub-micron sized molten soot particles. The burners are generally aligned over a rotating table in a refractory furnace where the particles are collected and fused into a large, dense, solid boule of glass. Typical materials used to make such glass includes high-purity titanium-containing feedstock, such as titanium alkoxide, $TiCl_4$ or titanium isopropoxide, and high purity silicon-containing feedstock, such as octamethylcyclotetrasiloxane or $SiCl_4$. During the combustion process, titanium doped silica soot is formed. Much of the particle soot is deposited on the rotating table, but some of the soot is not deposited and becomes an exhausted waste product particle of the silica forming process which is collected in a baghouse. The soot typically has a very high purity and very small particle size.

SUMMARY OF THE INVENTION

The invention includes a method for forming an EUV lithography glass substrate. The method includes forming a slurry mixture comprising titanium doped silica glass particle soot; providing a casting mold including therein a casting form, the casting form adapted to provide selected geometry void spaces within the EUV lithography glass substrate, inserting the titanium doped silica glass particle slurry mixture into the casting mold; drying the slurry mixture to form a green ware EUV lithography substrate; removing the casting form; and consolidating the green ware into a consolidated pore-free silica glass EUV lithography substrate having a homogeneous titanium silica glass dopant level in the range from 6 wt. % $TiO_2$ to about 9 wt. % $TiO_2$ and a homogeneous CTE in the range of +30 ppb/° C. to −30 ppb/° C. at 20–26° C., more preferably +20 ppb/° C. to −20 ppb/° C. at 20–26° C. Preferably the titanium doped silica glass particles have a dopant level in the range from 6 wt. % $TiO_2$ to 8 wt. % $TiO_2$ and said consolidated glass EUV lithography substrate titanium silica glass dopant level is in the range from 6 wt. % $TiO_2$ to 8 wt. % $TiO_2$. Preferably the titanium doped silica glass particles consist essentially of silica and titanium oxide.

The invention includes a method for forming a glass substrate with void spaces, preferably a lithography structure glass substrate. The method includes forming a slurry mixture comprising Ti doped silica soot particles and $H_2O$, said doped silica soot having a silica glass dopant level in the range from 6 wt. % $TiO_2$ to about 9 wt. % $TiO_2$; providing a glass substrate casting mold including therein a casting form, the casting form adapted to provide selected geometry void spaces within the glass substrate, inserting the Ti doped silica soot and $H_2O$ slurry mixture into the casting mold; drying the Ti doped silica soot and $H_2O$ slurry mixture to form a green ware Ti doped silica substrate; removing the casting form; and consolidating the green ware into a consolidated glass substrate with void spaces, said consolidated glass having a homogeneous titanium silica glass dopant level in the range from 6 wt. % $TiO_2$ to about 9 wt. % $TiO_2$ and a homogeneous CTE in the range of +30 ppb/° C. to −30 ppb/° C. at 20–26° C., more preferably +20 ppb/° C. to −20 at ppb/° C. at 20–26° C., preferably with the CTE having a variation in coefficient of thermal expansion $\leq 10$ ppb/° C. Preferably the doped silica soot silica glass dopant level is 6 to 8 wt. % $TiO_2$ and said consolidated glass homogeneous titanium dopant level is from 6 to 8 wt. % $TiO_2$, more preferably the doped silica soot silica glass dopant level is 6.8–7.5 wt. % $TiO_2$ and said consolidated glass homogeneous titanium dopant level is 6.8–7.5 wt. % $TiO_2$ Preferably the consolidated glass homogeneous CTE is in the range of +10 ppb/° C. to −10 ppb/° C. at 20–26° C., preferably with the CTE having a variation in coefficient of thermal expansion $\leq 5$ ppb/° C.

The invention includes a method for forming a glass object. The method includes forming slurry mixture including silica particle soot, and inserting the slurry mixture into a casting mold. The casting mold includes therein a casting form. The casting form is adapted to provide selected geometry void spaces within the molded glass object. The slurry mixture is dried to form a green ware object. The casting form is removed from the green ware and the green ware object is consolidated into a glass body with void spaces.

Preferably the silica soot glass particles have a titanium dopant weight percent level within the range from about 6 wt. % $TiO_2$ to about 9 wt. % $TiO_2$. In some embodiments, the silica soot is made by flame hydrolysis. In some embodiments the silica particles are made from sol-gel chemical solution processes, such as using TEOS (tetraethylorthosilicate) and titanium tetrapropoxide and titanium isopropoxide as silica and titania precursors. In some embodiments, forming the slurry mixture includes mixing the silica soot with water, preferably water and ammonia. In some embodiments, the consolidation includes heating the green ware object in a substantially non-reducing atmosphere.

The invention includes forming a lithography structure with void spaces by forming a slurry mixture comprising Ti doped silica soot and $H_2O$, said doped silica soot having a silica glass dopant level in the range from 6 wt. % $TiO_2$ to about 9 wt. % $TiO_2$; providing a lithography structure glass substrate casting mold including therein a casting form, the casting form adapted to provide selected geometry void spaces within the lithography structure, inserting the Ti doped silica soot and $H_2O$ slurry mixture into the casting mold; drying the Ti doped silica soot and $H_2O$ slurry mixture to form a green ware Ti doped silica substrate lithography structure; removing the casting form; and consolidating the green ware into a consolidated glass lithography structure with void spaces, said consolidated glass having a homogeneous titanium silica glass dopant level in the range from 6 wt. % $TiO_2$ to about 9 wt. % $TiO_2$ and a homogeneous CTE in the range of +30 ppb/° C. to −30 ppb/° C. at 20–26° C., more preferably +20 ppb/° C. to −20 ppb/° C. at 20–26° C.

Other aspects and advantages of the invention will be apparent from the following description and the appended claims.

DETAILED DESCRIPTION

The invention includes making thermally stable EUV lithography structure objects such as optical mirror element substrate structures and platen stage structures. PCT patent publication WO0108163 A1, EXTREME ULTRAVIOLET SOFT X-RAY PROJECTION LITHOGRAPHIC METHOD SYSTEM AND LITHOGRAPHY ELEMENTS of CORNING INCORPORATED by Davis et al. (application Ser. No. U.S.0018798, Filed 20000710, A1 Published 20010201) which is hereby incorporated by reference shows EUV lithography mirror element structures. U.S. Pat. No. 6,118, 150 (Feb. 13, 2001) of the EUV LLC by Paul Spence which is hereby incorporated by reference shows a lightweight high stiffness EUV lithography stage platen structure. U.S. Pat. No. 5,999,254 (Dec. 7, 1999) of the Schott Glas by Seibert et al. which is hereby incorporated by reference shows a lithography photomask supporting plate structure.

Figure 1:
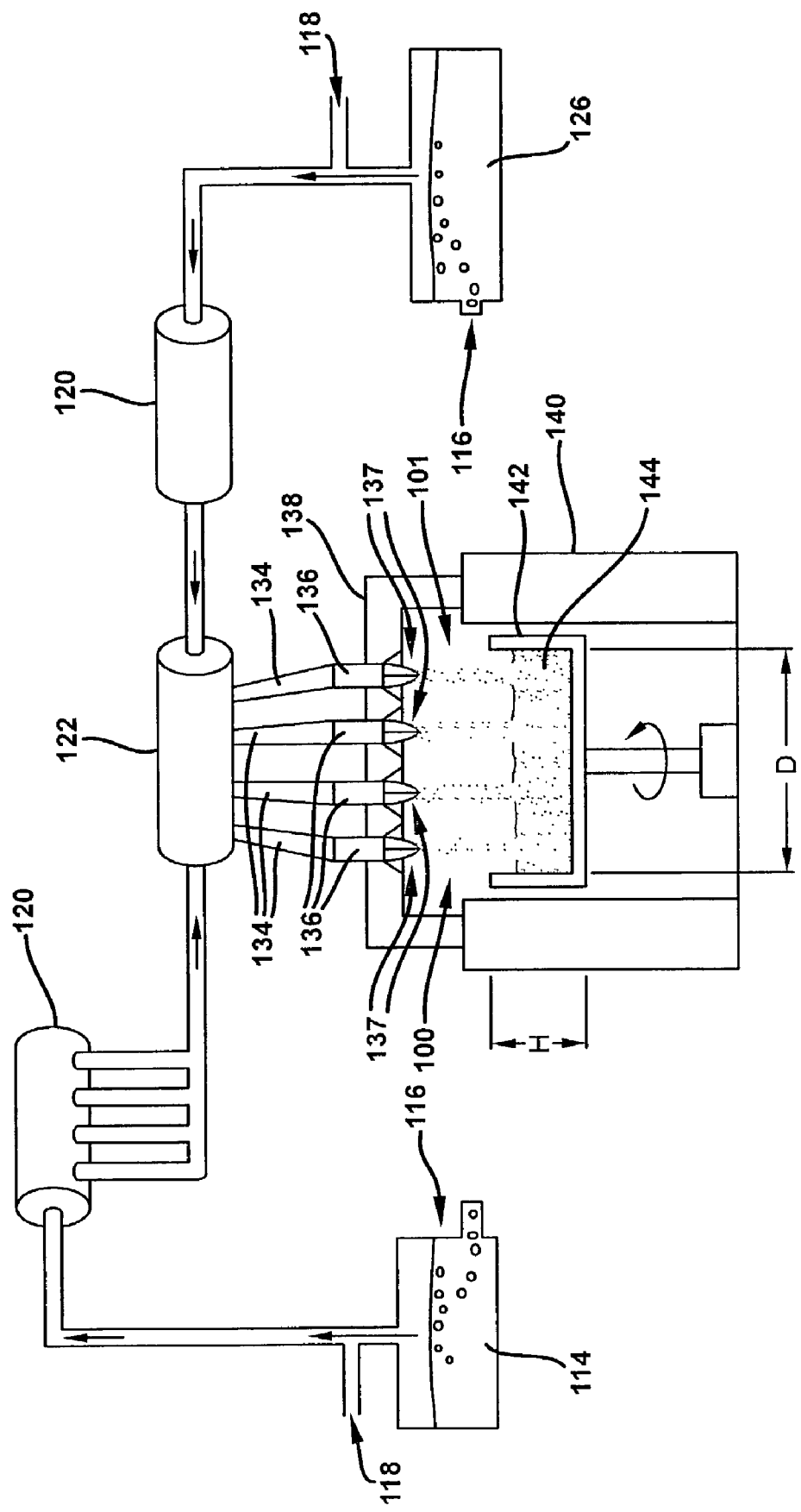
FIG. 1 shows an example of a flame hydrolysis system which can make silica soot useful in various embodiments of the invention.

An example of a flame hydrolysis system which can make silica glass particulate soot usable with various embodiments of the invention is shown in FIG. 1. Preferably, a high purity silicon-containing feedstock 114 and a high purity titanium-containing feedstock 126 are delivered to a conversion site 100 to be converted into particles of soot 100. The hydrolysis system may include for the purpose of making glass unrelated to the invention a revolving zircon collection cup 142 in a refractory zircon furnace 140 wherein a glass body 144 is formed by deposition of the soot 101. The high purity silicon-containing feedstock 114 may be octamethylcyclotetrasiloxane and the high purity titanium-containing feedstock 126 may be titanium isopropoxide, although these materials are not intended to limit the scope of the invention. A nitrogen-inert carrier gas 116 is bubbled through the feedstocks 114, 126, and a nitrogen-inert carrier gas 118 is added to the feedstock vapor/carrier mixtures to facilitate delivery of the mixtures to the conversion site 100, through a distribution system 120 and manifold 122. Preferably the feedstock mixtures are mixed in the manifold 122 to form a substantially homogeneous gaseous titanium-doped $SiO_2$ precursor mixture. The precursor mixture is delivered through conduits 134 to conversion site burners 136, which are typically mounted in an upper portion 138 of the furnace 140. Burner flames 137 convert the feedstock mixture (precursor) into silica soot. The amount of titanium dopant may be changed by adjusting the amount of either the titanium feedstock 126 or the silica feedstock delivered. The conversion site 100 may not deposit all the soot 101 onto the glass body 144. Waste byproduct amounts of the soot 101 may be collected and used in various embodiments of the invention. In a preferred alternative the soot is intentionally produced as the main product such as described in pending U.S. patent application Ser. No. 09/458,898, filed Dec. 10, 1999, entitled Process For Producing Silica Soot, of Kar et al. and EP1106582, Silica soot and process for producing it, Corning Incorporated, Inventor(s):; Gitimoy, Kar, Corning Incorporated; Chunzhe, Charles Yu, Application No. EP00122419, Filed 20001013, A2 Published 20010613, which are incorporated herein by reference in entirety, and then the soot can be used in various embodiments of the invention.

The foregoing example of a flame hydrolysis system is not meant to limit the invention as to the source of silica soot used in various embodiments of the invention. The various embodiments of the invention preferably have sufficient purity, preferred chemical composition and preferred particle size of the silica soot. Other systems and methods for generating silica glass particles may be used in embodiments of the invention. One such other method is sol-gel and solution chemistry processes. Preferably the titanium is doped into the silica glass at the time of silica glass particle soot generation. Alternatively atomic scale mixing of titania and silica may be obtained through solution chemistry.

The titanium content of the silica soot can be adjusted to a dopant level in a range of about zero to ten percent by weight. Typically, the soot particle size will be in a range of about 0.005 microns to 0.4 microns, with an average particle size of about 0.2 microns.

Soot collected from a system such as shown in FIG. 1 may then be used to cast a desired shape or configuration object. A slurry is formed using the collected soot. A typical slurry may be formed by mixing about 70 percent by weight of soot with 30 percent by weight of a liquid phase, preferably $H_2O$. The liquid phase may include a solution of ammonia in water, preferably having about 1 to 28 percent ammonia. The silica soot $H_2O$ slurry is then put into a casting mold. The slurry is inserted into the mold such as by pouring the slurry or injecting the slurry into the mold. In an embodiment the liquid phase includes a solution of a base with water. In an embodiment the liquid phase is a solution of TEA(triethylamine) with water.

After the slurry has dry hardened, the resulting "green ware" may be consolidated to form a fully consolidated glass structure. In preferred embodiments of the invention, a casting form is used to introduce selected void geometry within the finished cast glass structure. Consolidation may include, in one example, heating, preferably in a substantially non-reducing atmosphere such as helium, or in a vacuum, preferably by increasing the temperature 5° C., per minute to a temperature of about 1450° C. This temperature may be held for about 5 to 10 minutes. Then the temperature may be increased to a maximum temperature of about 1500° C., and the atmosphere may be changed to air, to enable final consolidation.

Preferably consolidating the cast green ware includes inhibiting the slumping of the green ware and consolidated glass body so as to provide the void spaces in the end glass product. Preferably consolidation is achieved with a consolidation temperature in the range of 1300 to 1500° C. The preferred consolidation temperature is in the range of 1350 to 1450° C., more preferably 1375 to 1425° C., and most preferably about 1400° C. (1400±10° C).

Figure 2:
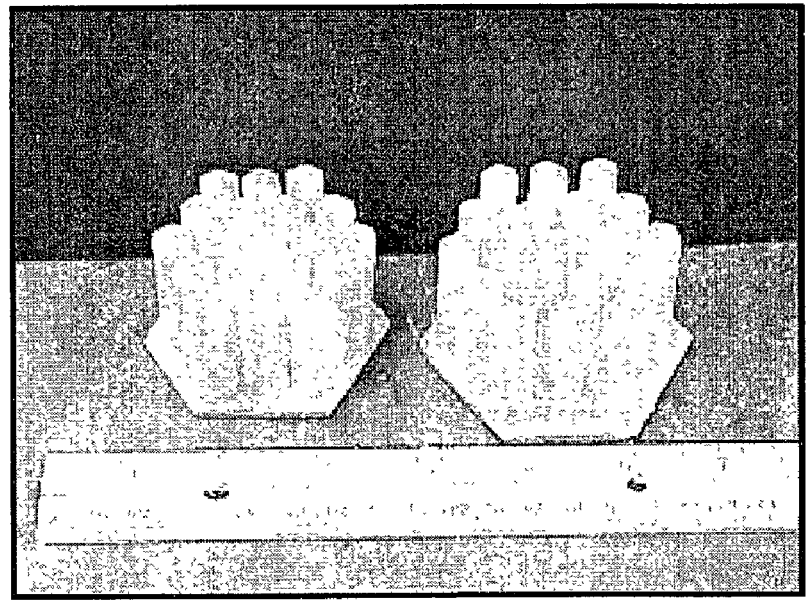
FIG. 2 shows embodiments of casting forms used to form internal voids within a cast structure according to the invention.
Figure 3:
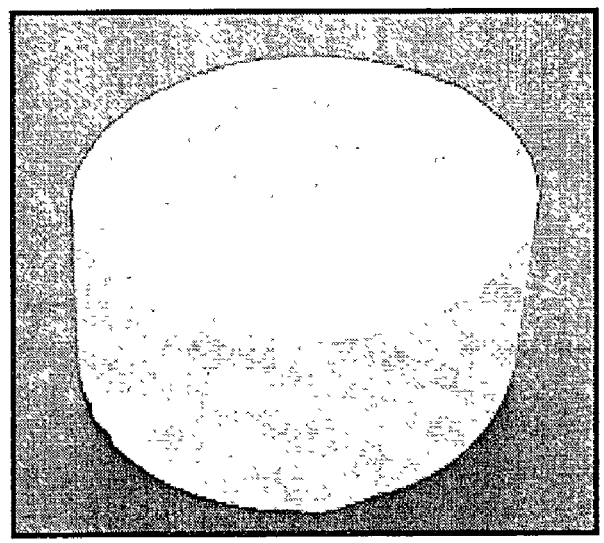
FIG. 3 shows a cast green ware substrate disk structure with internal voids formed with a casting form like that of FIG. 2 in accordance with the invention.

An example of a casting form used to make predetermined geometry internal void spaces within a cast glass substrate structure is shown in FIG. 2. The casting form in FIG. 2 may be formed, for example, by extruding microcrystalline wax through an extruding die or mask. The example casting form includes hexagonal pillars. The hexagonal pillars represent the intended predetermined shape of void spaces to be formed within the body of the finished cast glass lithography structure. The purpose of providing void spaces in the finished cast glass structure is to decrease its mass weight, while substantially maintaining the strength of the finished cast glass structure. Such weight reduced low mass strong and stable rigid structures are required for EUV lithography glass stages. In a preferred embodiment of the invention, a microcrystalline wax casting form is utilized and preferably removed by vacuum pyrolysis after the slurry is fully hardened. In other embodiments, the casting form may be removed through pore spaces in the "green ware" (dried, cast molded slurry) if the green ware can withstand mismatch of thermal expansion between itself and the casting form material. In FIG. 2 are shown two casting forms, which were made by extruding a microcrystalline mold wax through a hexagonal shaped die and cut to a uniform length. The hexagonal wax pieces were then mounted to a substrate plate in a triangular lattice array to form a negative for forming a honeycomb structure with an array of hexagonal geometric voids such as shown in FIG. 3. FIG. 3 shows a cast green ware structure with an array of hexagonal void spaces formed by mold wax casting form pieces as shown in FIG. 2, with the wax hexagons preventing the intrusion of the slurry and providing hexagonal void spaces when removed.

Figure 4:
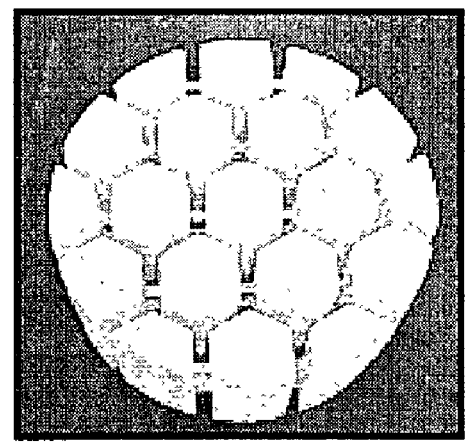
FIG. 4 shows one embodiment of a casting form used to form internal voids within a cast structure according to an embodiment of the invention.
Figure 5:
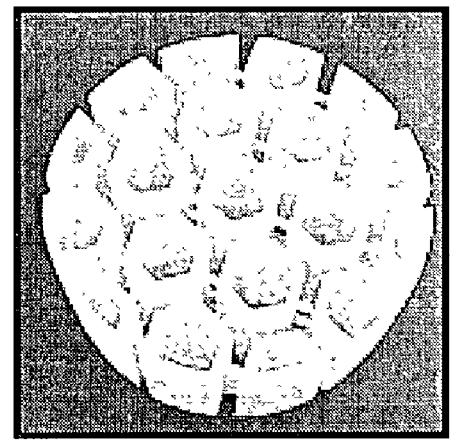
FIG. 5 shows the opposite view of the casting form of FIG. 4.

Another casting form is shown in FIGS. 4 and 5. FIG. 5 is the opposite side view of the casting form of FIG. 4. The casting form of FIGS. 4 and 5 is a rapid prototyped plastic starch polymer casting form formed with a computer assisted rapid prototyping process. The rapid prototyping of the casting form in FIGS. 4–5 provides a casting form with an array of preferred hollow pillar pieces (including hexagonal pieces, trapezoidal pieces, pentagonal pieces, circular curved pieces) of appropriate void forming geometry and interconnecting smaller channel pieces which hold the larger pillar pieces of the array in place and are also preferably hollow and provide for fluid communication between the larger pillar pieces. The casting form of FIGS. 4 and 5 may be formed from wax, or suitable polymeric plastic material for precision of structure and formation thereof. In a preferred embodiment the casting mold is formed by rapid prototyping using a predetermined computer generated prototype model which is formed in successive built up layers. Preferably the rapid prototyped casting form is comprised of a rapid prototype plastic mold polymer. The pillars may include internal voids therein (hollow pillars) to make it easier to remove the casting form from the dried green ware prior to consolidation, such as with removal of the casting form by melting, pyrolysis, and oxidation. In the embodiment shown in FIGS. 4–5, the hollow space voids in the hollow pillars may be interconnected by internal channels. The interconnecting internal channels form internal gas transfer channels in the dried green ware, which makes it easier to remove the casting form prior to consolidation. The casting form selected geometry void space forming elements are transient solid objects which are positioned within the casting mold vessel to prevent the flow and intrusion of the slurry into certain predetermined volume spaces. The transient casting form elements are later removed to leave behind a void space cavity. In preferred embodiments the casting form is comprised of a plastic polymer. In addition to rapid prototype formation, the plastic polymer casting forms are formable by injection molding, embossing, extrusion, and casting. In a preferred alternative embodiment the plastic polymer casting form is comprised of a low density polymer with void spaces such as air bubbles. In a preferred alternative embodiment the plastic polymer casting form is comprised of a porous plastic structure with a lowered density.

In embodiments, drying the slurry to form a green ware substrate structure includes actively extracting the water liquid phase from the slurry to cause the slurry to set. Actively extracting the liquid phase water can include applying a drying vacuum to the slurry to extract the water liquid phase. Actively extracting the liquid phase water can include applying a drying pressure to the slurry to force the water liquid phase out. Actively extracting the liquid phase water can include extracting the water liquid phase out of the slurry and into the casting mold and forms. In an alternative embodiment the invention includes chemically setting the slurry to cause the slurry to set in the mold by utilizing a chemically active gelling agent. In a preferred alternative embodiment chemically setting includes gelcasting the slurry in the casting mold with the casting form.

The invention includes making an EUV lithography glass substrate, by forming a slurry comprising titanium doped silica glass particles; providing a casting mold including therein a casting form, the casting form adapted to provide selected geometry void spaces within the EUV lithography glass substrate, inserting the titanium doped silica glass particle slurry into the casting mold; drying the slurry to form a green ware EUV lithography substrate; removing the casting form; and consolidating the green ware into a consolidated glass EUV lithography substrate having a homogeneous titanium silica glass dopant level in the range from 6 wt. % $TiO_2$ to about 9 wt. % $TiO_2$ and a homogeneous CTE in the range of +20 ppb/° C. to −20 ppb/° C. at 20–26° C. Preferably the titanium doped silica glass particles have a dopant level in the range from 6 wt. % $TiO_2$ to about 8 wt. % $TiO_2$ and said consolidated glass EUL lithography substrate titanium silica glass dopant level is in the range from 6 wt. % $TiO_2$ to about 8 wt. % $TiO_2$. Preferably the titanium doped silica glass particles are a flame hydrolysis formed titanium doped silica glass particle soot. Forming the slurry preferably comprises mixing titanium doped silica glass particles with water and ammonia. In a preferred embodiment the casting form is comprised of a mold wax, most preferably the casting form wax is microcrystalline wax. In a preferred embodiment providing a casting mold includes extruding a casting form through a die to provide an extruded casting mold. In an alternative embodiment providing a casting mold includes rapid prototyping a casting mold from a computer model. Preferably the casting form comprises channels connecting individual elements of the form with the channels forming gas communication channels in the green ware. In preferred embodiments removing the casting form includes melting and vacuum pyrolysis. In a preferred embodiment removing the casting form includes extracting the form material through the permeable porosity of the green ware. Preferably consolidating the green ware comprises heating the green ware in a substantially non-reducing atmosphere.

The invention includes making a glass substrate with void spaces by forming a slurry comprising Ti doped silica soot and $H_2O$, said doped silica soot having a silica glass dopant level in the range from 6 wt. % TiO$_2$ to about 9 wt. % TiO$_2$; providing a glass substrate casting mold including therein a casting form, the casting form adapted to provide selected geometry void spaces within the glass substrate, inserting the Ti doped silica soot and H$_2$O slurry into the casting mold; drying the Ti doped silica soot and H$_2$O slurry to form a green ware Ti doped silica substrate; removing the casting form; and consolidating the green ware into a consolidated glass substrate with void spaces, said consolidated glass having a homogeneous titanium silica glass dopant level in the range from 6 wt. % TiO$_2$ to about 9 wt. % TiO$_2$ and a homogeneous CTE is in the range of +20 ppb/° C. to −20 ppb/° C. at 20–26° C. Preferably the doped silica soot silica glass dopant level is 6 to 8 wt. % TiO$_2$ and said consolidated glass homogeneous titanium dopant level is from 6 to 8 wt. % TiO$_2$. Most preferably the doped silica soot silica glass dopant level is 6.8–7.5 wt. % TiO$_2$ and the consolidated glass homogeneous titanium dopant level is 6.8–7.5 wt. % TiO$_2$. Preferably the consolidated glass homogeneous CTE is in the range of +10 ppb/° C. to −10 ppb/° C. at 20–26°, preferably with the CTE having a variation in coefficient of thermal expansion ≦10 ppb/° C., most preferably ≦5 ppb/° C.

The invention includes making a lithography structure with void spaces, by forming a slurry comprising Ti doped silica soot and H$_2$O, said doped silica soot having a silica glass dopant level in the range from 6 wt. % TiO$_2$ to about 9 wt. % TiO$_2$; providing a lithography structure glass substrate casting mold including therein a casting form, the casting form adapted to provide selected geometry void spaces within the lithography structure, inserting the Ti doped silica soot and H$_2$O slurry into the casting mold; drying the Ti doped silica soot and H$_2$O slurry to form a green ware Ti doped silica substrate lithography structure; removing the casting form; and consolidating the green ware into a consolidated glass lithography structure with void spaces, said consolidated glass having a homogeneous titanium silica glass dopant level in the range from 6 wt. % TiO$_2$ to about 9 wt. % TiO$_2$ and a homogeneous CTE is in the range of +20 ppb/° C. to −20 ppb/° C. at 20–26° C. Preferably the doped silica soot silica glass dopant level is 6 to 8 wt. % TiO$_2$ and said consolidated glass homogeneous titanium dopant level is from 6 to 8 wt. % TiO$_2$. Most preferably the doped silica soot silica glass dopant level is 6.8–7.5 wt. % TiO$_2$ and the consolidated glass homogeneous titanium dopant level is 6.8–7.5 wt. % TiO$_2$. Preferably the consolidated glass homogeneous CTE is in the range of +10 ppb/° C. to −10 ppb/° C. at 20–26°, preferably with the CTE having a variation in coefficient of thermal expansion ≦10 ppb/° C., most preferably ≦5 ppb/° C.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming an EUV lithography glass substrate, comprising:
   forming a slurry comprising titanium doped silica glass particles;
   providing a casting mold including therein a casting form, the casting form adapted to provide selected geometry void spaces within the EUV lithography glass substrate,
   inserting the titanium doped silica glass particle slurry into the casting mold;
   drying the slurry to form a green ware EUV lithography substrate;
   removing the casting form; and
   consolidating the green ware into a consolidated glass EUV lithography substrate having a homogeneous titanium silica glass dopant level in the range from 6 wt. % TiO$_2$ to about 9 wt. % TiO$_2$ and a homogeneous CTE in the range of +30 ppb/° C. to −30 ppb/° C. at 20–26° C.

2. The method as defined in claim 1 wherein the casting form comprises microcrystalline wax.

3. The method as defined in claim 1 wherein the removing the casting form comprises vacuum pyrolysis.

4. The method as defined in claim 1 wherein the removing the casting form comprises extraction through pore spaces in the green ware.

5. The method as defined in claim 1 wherein providing a casting mold including therein a casting form includes extruding a casting form through a die.

6. The method as defined in claim 1 wherein the casting form comprises channels connecting individual elements of the form, the channels forming gas channels in the green ware.

7. The method as defined in claim 1 wherein the titanium doped silica glass particles is a flame hydrolysis formed titanium doped silica glass particle soot.

8. The method as defined in claim 1 wherein the titanium doped silica glass particle has a dopant level in the range from 6 wt. % TiO$_2$ to about 8 wt. % TiO$_2$ and said consolidated glass EUV lithography substrate titanium silica glass dopant level is in the range from 6 wt. % TiO$_2$ to about 8 wt. % TiO$_2$.

9. The method as defined in claim 1 wherein the consolidating comprises heating in a substantially non-reducing atmosphere.

10. The method as defined in claim 1 wherein the forming the slurry comprises mixing titanium doped silica glass particles with water and ammonia.

11. A method for forming a glass substrate with void spaces, comprising:
    forming a slurry comprising Ti doped silica soot and H$_2$O, said doped silica soot having a silica glass dopant level in the range from 6 wt. % TiO$_2$ to about 9 wt. % TiO$_2$;
    providing a glass substrate casting mold including therein a casting form, the casting form adapted to provide selected geometry void spaces within the glass substrate, inserting the Ti doped silica soot and H$_2$O slurry into the casting mold;
    drying the Ti doped silica soot and H$_2$O slurry to form a green ware Ti doped silica substrate;
    removing the casting form; and
    consolidating the green ware into a consolidated glass substrate with void spaces, said consolidated glass having a homogeneous titanium silica glass dopant level in the range from 6 wt. % TiO$_2$ to about 9 wt. % TiO$_2$ and a homogeneous CTE is in the range of +30 ppb/° C. to −30 ppb/° C. at 20–26° C.

12. The method as defined in claim 11 wherein, said doped silica soot silica glass dopant level is 6 to 8 wt. % TiO$_2$ and said consolidated glass homogeneous titanium dopant level is from 6 to 8 wt. % TiO$_2$.

13. The method as defined in claim 11 wherein, said doped silica soot silica glass dopant level is 6.8–7.5 wt. % TiO$_2$ and said consolidated glass homogeneous titanium dopant level is 6.8–7.5 wt. % TiO$_2$.

14. The method as defined in claim 12 wherein said consolidated glass homogeneous CTE is in the range of +20 ppb/° C. to −20 ppb/° C. at 20–26° C.

15. The method as defined in claim 12 wherein said CTE has a variation in coefficient of thermal expansion ≦10 ppb/° C.

16. The method as defined in claim 14 wherein said CTE has a variation in coefficient of thermal expansion ≦5 ppb/° C.

17. A method for forming a lithography structure with void spaces, comprising:
forming a slurry comprising Ti doped silica soot and $H_2O$, said doped silica soot having a silica glass dopant level in the range from 6 wt. % $TiO_2$ to about 9 wt. % $TiO_2$;
providing a lithography structure glass substrate casting mold including therein a casting form, the casting form adapted to provide selected geometry void spaces within the lithography structure;
inserting the Ti doped silica soot and $H_2O$ slurry into the casting mold;
drying the Ti doped silica soot and $H_2O$ slurry to form a green ware Ti doped silica substrate lithography structure;
removing the casting form; and
consolidating the green ware into a consolidated glass lithography structure with void spaces, said consolidated glass having a homogeneous titanium silica glass dopant level in the range from 6 wt. % $TiO_2$ to about 9 wt. % $TiO_2$ and a homogeneous CTE is in the range of +30 ppb/° C. to −30 ppb/° C. at 20–26° C.

18. A method for forming an EUV lithography glass substrate, comprising:
forming a mixture comprising titanium doped silica glass particles;
providing a casting mold including therein a casting form, the casting form adapted to provide selected geometry void spaces within the EUV lithography glass substrate,
inserting the titanium doped silica glass particle mixture into the casting mold;
drying the mixture to form a green ware EUV lithography substrate;
removing the casting form; and
consolidating the green ware into a consolidated glass EUV lithography substrate having a homogeneous titanium silica glass dopant level in the range from 6 wt. % $TiO_2$ to about 9 wt. % $TiO_2$ and a homogeneous CTE in the range of +30 ppb/° C. to −30 ppb/° C. at 20–26° C.

19. The method as defined in claim 18 wherein the casting form comprises microcrystalline wax.

20. The method as defined in claim 18 wherein the removing the casting form comprises vacuum pyrolysis.

21. The method as defined in claim 18 wherein the removing the casting form comprises extraction through pore spaces in the green ware.

22. The method as defined in claim 18 wherein providing a casting mold including therein a casting form includes extruding a casting form through a die.

23. The method as defined in claim 18 wherein the casting form comprises channels connecting individual elements of the form, the channels forming gas channels in the green ware.

24. The method as defined in claim 18 wherein the titanium doped silica glass particles is a flame hydrolysis formed titanium doped silica glass particle soot.

25. The method as defined in claim 18 wherein the titanium doped silica glass particle has a dopant level in the range from 6 wt. % $TiO_2$ to about 8 wt. % $TiO_2$ and said consolidated glass EUV lithography substrate titanium silica glass dopant level is in the range from 6 wt. % $TiO_2$ to about 8 wt. % $TiO_2$.

26. The method as defined in claim 18 wherein the consolidating comprises heating in a substantially non-reducing atmosphere.

27. A method for forming a glass substrate with void spaces, comprising:
forming a mixture comprising Ti doped silica particles, said doped silica having a silica glass dopant level in the range from 6 wt. % $TiO_2$ to about 9 wt. % $TiO_2$;
providing a glass substrate casting mold including therein a casting form, the casting form adapted to provide selected geometry void spaces within the glass substrate, inserting the Ti doped silica mixture into the casting mold;
drying the Ti doped silica mixture to form a green ware Ti doped silica substrate;
removing the casting form; and
consolidating the green ware into a consolidated glass substrate with void spaces, said consolidated glass having a homogeneous titanium silica glass dopant level in the range from 6 wt. % $TiO_2$ to about 9 wt. % $TiO_2$ and a homogeneous CTE is in the range of +30 ppb/° C. to −30 ppb/° C. at 20–26° C.

28. The method as defined in claim 27 wherein, said doped silica glass dopant level is 6 to 8 wt. % $TiO_2$ and said consolidated glass homogeneous titanium dopant level is from 6 to 8 wt. % $TiO_2$.

29. The method as defined in claim 27 wherein, said doped silica glass dopant level is 6.8–7.5 wt. % $TiO_2$ and said consolidated glass homogeneous titanium dopant level is 6.8–7.5 wt. % $TiO_2$.

30. The method as defined in claim 27 wherein said consolidated glass homogeneous CTE is in the range of +20 ppb/° C. to −20 ppb/° C. at 20–26° C.

31. The method as defined in claim 30 wherein said CTE has a variation in coefficient of thermal expansion ≦10 ppb/° C.

32. The method as defined in claim 30 wherein said CTE has a variation in coefficient of thermal expansion ≦5 ppb/° C.

33. A method for forming a lithography structure with void spaces, comprising:
forming a mixture comprising Ti doped silica particles, said doped silica having a silica glass dopant level in the range from 6 wt. % $TiO_2$ to about 9 wt. % $TiO_2$;
providing a lithography structure glass substrate casting mold including therein a casting form, the casting form adapted to provide selected geometry void spaces within the lithography structure;
inserting the Ti doped silica particles into the casting mold;
drying the Ti doped silica particles to form a green ware Ti doped silica substrate lithography structure;
removing the casting form; and
consolidating the green ware into a consolidated glass lithography structure with void spaces, said consolidated glass having a homogeneous titanium silica glass dopant level in the range from 6 wt. % $TiO_2$ to about 9 wt. % $TiO_2$ and a homogeneous CTE is in the range of +30 ppb/° C. to −30 ppb/° C. at 20–26° C.

* * * * *